(No Model.) 4 Sheets—Sheet 2.
A. W. SPATZIER.
ANTI FRICTION AXLE BEARING.
No. 323,966. Patented Aug. 11, 1885.
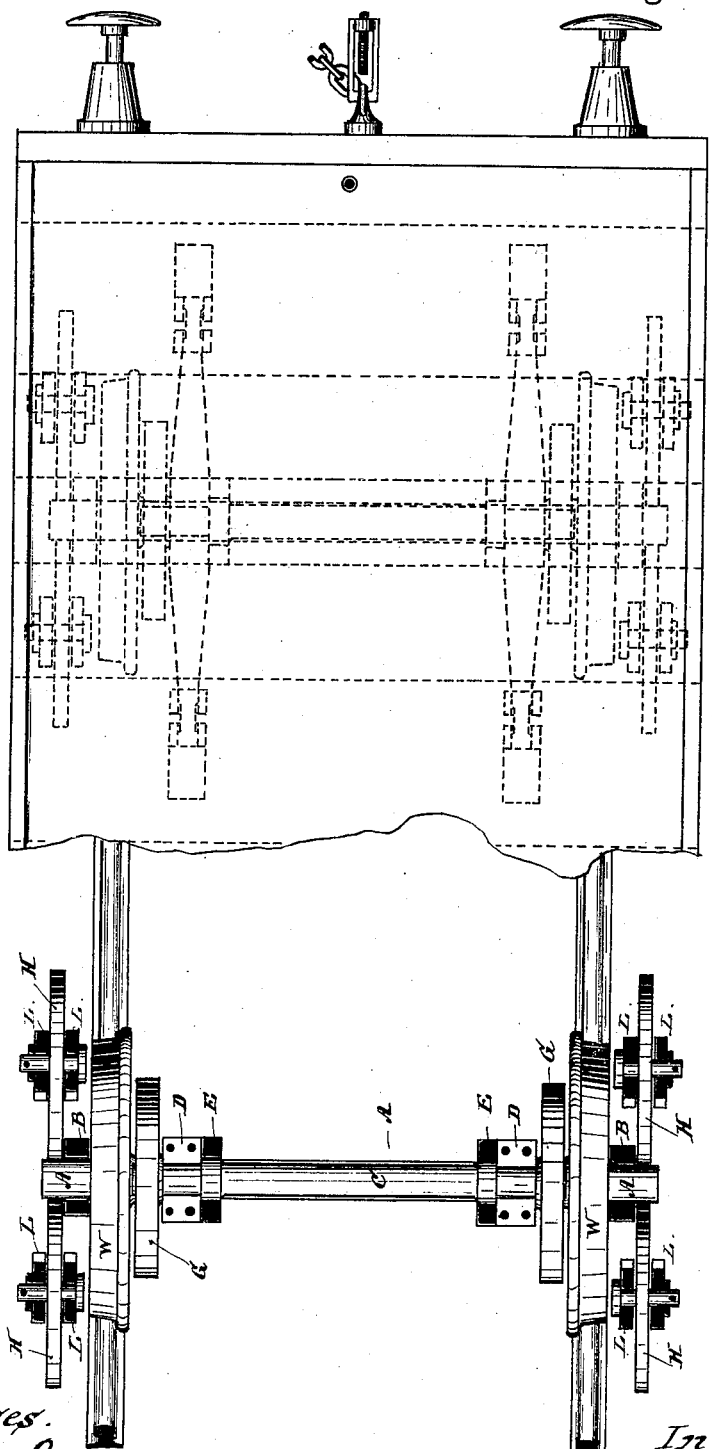
Fig. V.
Witnesses.
Edw'd Stiles
Inventor.
August W. Spatzier
per Henry E. Roeder
Attorney

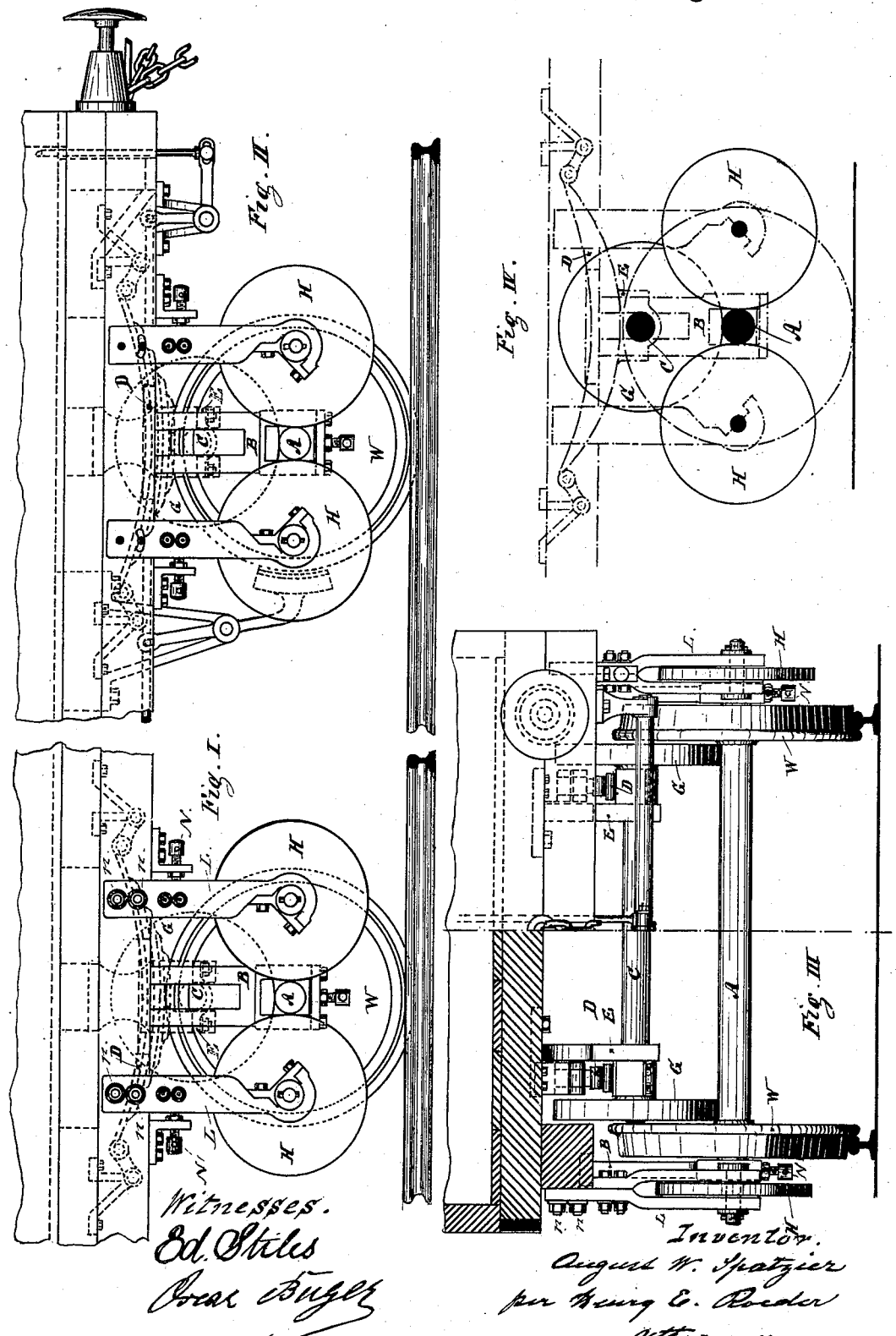

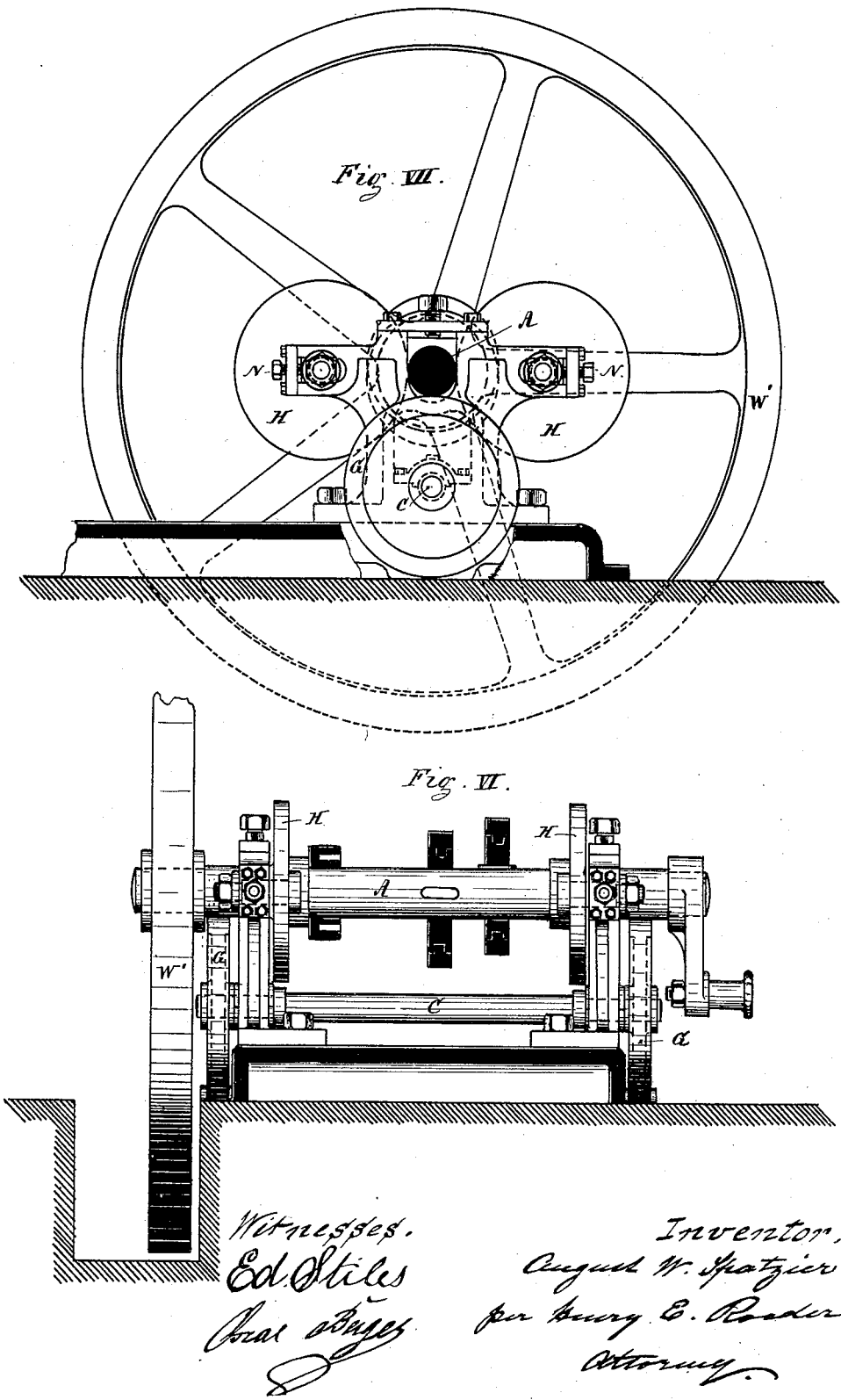

(No Model.) 4 Sheets—Sheet 4.
A. W. SPATZIER.
ANTI FRICTION AXLE BEARING.
No. 323,966. Patented Aug. 11, 1885.
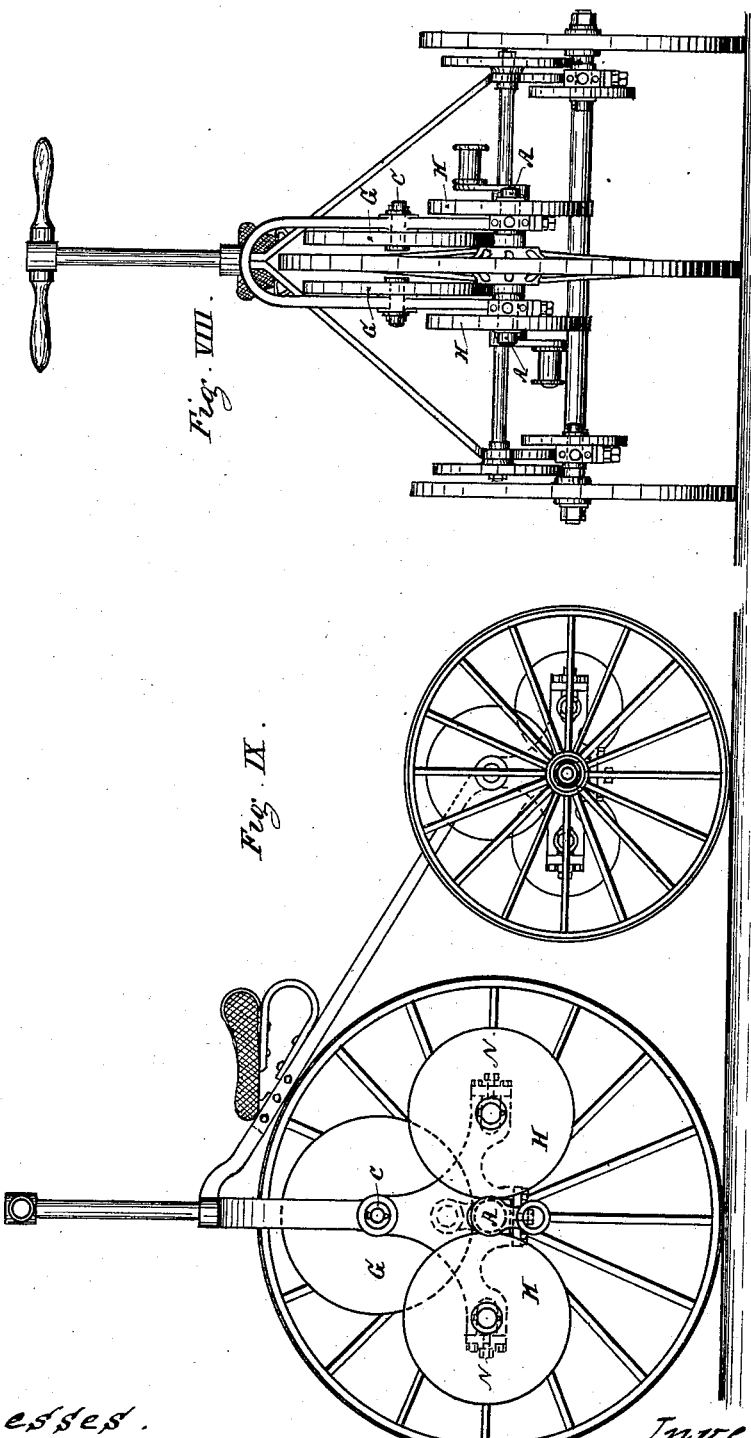
Witnesses.
Ed. Stiles
Oscar Fuggs
Inventor.
August W. Spatzier
per Henry E. Rauder
Attorney

UNITED STATES PATENT OFFICE.

AUGUST WILHELM SPATZIER, OF LEIPSIC, GERMANY.

ANTI-FRICTION AXLE-BEARING.

SPECIFICATION forming part of Letters Patent No. 323,966, dated August 11, 1885.

Application filed December 5, 1884. (No model.)

*To all whom it may concern:*

Be it known that I, AUGUST WILHELM SPATZIER, a citizen of Germany, residing at Leipsic, in the Empire of Germany, have invented a new and useful Improvement in Anti-Friction Arrangements for Shafts or Axles, of which the following is a specification.

In the accompanying drawings, Figures I to V represent the arrangement on a railway-carriage, where Figs. I and II are front views of the wheel with my improvement attached. Fig. III is an end view of the same. Fig. IV is a front view of the same, showing only the general outlines. Fig. V is a top view or plan of the same. Fig. VI is an end view, and Fig. VII a front view, of an axle for a steam-engine with my improvement attached; and Figs. VIII and IX are front and side views of a velocipede with my improvement attached.

Similar letters represent similar parts in all the figures.

In a suitable frame, E, attached to the car or to the frame of the machine, a shaft, C, is supported, capable of moving upward or downward, upon which said shaft C the usual springs, D, are arranged to bear. On the ends of this shaft C pulleys G G are firmly attached, the peripheries of which bear upon the circumference of the main shaft or axle A, supporting in Figs. I to V the car-wheels W, and in Figs. VI and VII the fly-wheel W', with crank and the other usual parts. Against the circumference of this axle A, either inside or outside of the wheels W or fly-wheel W', (according to the general construction and arrangement of the machine,) wheels H H are arranged, supporting and guiding said axle A sidewise. These wheels H H are supported in suitable frames, L, against which, as shown in Figs. I and II, set-screws N are arranged to move the same, and consequently the wheels H H, against the main axle or shaft A, to enable the exact regulation of bearing against the sides of the axle A. In this case one of the bolts $n$, which fasten the frames L to car-frame, acts as a pivot for said frame, while the second bolt acts to secure the said frame in the position as regulated by the action of the set-screw N. The set-screw N may likewise be arranged to pass through the cap of the bearing and act directly against the bearing of the axle of the wheels H H, as shown in Figs. V, VII, and VIII, and whereby the position and the guiding of the axle A can be regulated as may be required. The axle A runs in suitable bearings in frames B, attached to the car or to the frame of the machine. By this arrangement the upward strain or friction of the axle A is supported by the wheels G, while the side strain or friction is taken by the side wheels, H H, thereby relieving the journals of this axle of all strain, and considerably reducing the friction, and consequently the power to overcome the same.

What I claim as my invention, and desire to secure by Letters Patent, is—

In combination with the main axle A of a railway-car, steam-engine, or other machine, the central friction-roller, G, and the side friction-rollers, H H, supported in adjustable bearings or frames L, and acted upon by set-screws N, in the manner and for the purpose described.

In testimony whereof I have signed my name to this specification in the presence of two subscribing witnesses.

AUGUST WILHELM SPATZIER.

Witnesses:
EDMUND BACH,
HEINRICH ZUSKE.